July 8, 1969  G. H. GEISINGER  3,454,247

BULKHEAD MOUNTING PLATE

Filed Aug. 7, 1967

INVENTOR
GEORGE GEISINGER

BY David Jeseline
ATTORNEY ure and the bulkhead, depending upon the number of wires and the size of clamp to be employed. Often, prior installation of the L shaped bracket is not possible until it is known exactly how many wires are to be passed through this aperture and thus what size clamp is to be employed. As is shown in FIG. 1 the clamp and support member are external to the aperture within the bulkhead and thus fail to serve as an insulation protection device for the wires entering the aperture. Any tension applied to the wires to the left side of the bulkhead as shown in FIG. 1 could easily cause them, or their weight themselves could easily cause them, to come in contact with the rough edge of the aperture in the bulkhead and thus abraid and destroy the insulation, causing the undesired loss of signals, or a short circuit as mentioned above.

United States Patent Office 3,454,247
Patented July 8, 1969

3,454,247
BULKHEAD MOUNTING PLATE
George H. Geisinger, Elizabeth, N.J., assignor to The Thomas & Betts Co., Elizabeth, N.J., a corporation of New Jersey
Filed Aug. 7, 1967, Ser. No. 658,796
Int. Cl. B22c 9/28; F16l 3/08
U.S. Cl. 248—56
6 Claims

ABSTRACT OF THE DISCLOSURE

The invention is directed to a wire mounting and supporting plate arranged to fit within an aperture in a bulkhead and to permit the passage of one or more wires through said aperture in such a manner that the insulation about said wires cannot be destroyed, or injured, by the edges of the aperture in said bulkhead. The device consists of a wire-support cradle of arcuate cross-section, such that it may accept one or a plurality of wires. Extending from said cradle are clamping extension arms, each having a limiting hub at its extreme end. A cable bundling strap may then be wrapped about the said wires and said extensions to firmly affix said wires to said cradle. Cradle support arms extend from the cradle on either side of the bulkhead. Provision is made for the receipt of a fastening device through said cradle support arms and bulkhead to fix the plate in position.

BACKGROUND OF THE INVENTION

Field of the invention

The invention finds general utility in those areas where it is desirable to pass one or more insulated wires through metal bulkheads or other partitions. Such a situation generally exists in the wiring of aircraft and marine vessels. In such situations the bulkheads or various walls separating the compartments of the craft are cut with varying size and shaped apertures to permit wires to be passed therethrough. Little care is taken as to the finish of the edges and in most cases the edges of these apertures are rough and sharp and will readily cut through the insulation of wires passed therethrough. Such possibilities for destruction of the insulation are increased by the vibrations to which the vehicle is subjected and to the high and low temperature variations and possible contact between persons within the vehicles and the wires themselves. The obvious result of destruction of the insulation on such wires is the shorting of the equipment or the loss of the signals passing through these wires. Similar situations also occur at home and in industrial construction where wires such as inter-communication line wires are passed through various partitions, walls, or bulk-heads within the home or industrial bulidings.

DESCRIPTION OF THE PRIOR ART

FIGS. 1 and 2 illustrate side and front views respectively of prior art devices extensively used at this time. Affixed, adjacent the aperture in the bulkhead, is an L shaped support member which may be preassembled to the bulkhead at the time that the aperture is made. A clamp must be placed about the wire, or group of wires, and must then in turn be clamped by means of a fastening device to the L shaped support bracket. Due to the wide desparity in the number of wires required to pass through any particular aperture a great number of clamps are required in order to accommodate all possible combinations and numbers of wires employed. It can also be seen in FIG. 2 that the clamp and the L shaped bracket, must be placed at varying distances from the center line of the

SUMMARY OF THE INVENTION

The present invention provides a simple light-weight, low-cost device which obviates all of the foregoing disadvantages of bulkhead clamping devices currently in use. It permits the use of a single size bulkhead mounting plate for a wide range of wire numbers and sizes. The reason for this, is that the clamping action is achieved by means of cable bundling straps which are affixed to extensions of the wire cradle and thus may be made as large as are necessary to accommodate the number of wires present. Further, the entire assembly fits within the aperture of the bulkhead and thus effectively serves as a protective passage for the wires over the rough edges of the bulkhead aperture. The entire bulkhead mounting plate may be pre-assembled to the aperture within the bulkhead without any consideration as to the number of wires that are to be placed in the cradle thereof. The only thing that is necessary in the use of this device is to pass the wires over the cradle and attach the cable bundling straps on the cradle extension at the time of use.

It is therefore an object of this invention to provide an improved form of bulkhead mounting plate.

It is still another object of this invention to provide an improved form of bulkhead wire clamping system.

It is yet another object of this invention to provide an inexpensive, easily installed, light-weight bulk-head mounting plate which can be pre-assembled to the bulkhead apertures without reference to the number or size of wires to be passed through said aperture.

Other objects and features of the invention we pointed out the following description, and claims, and illustrated in the accompanying drawings, which disclose, by way of example, the principle of the invention, and the best mode which has been contemplated for carrying it out.

BRIEF DESCRIPTION OF THE DRAWING

Similar elements are given similar reference characters in each of the respective drawings.

DESCRIPTION OF THE PREFERRED EMBODIMENT

Figure 1:
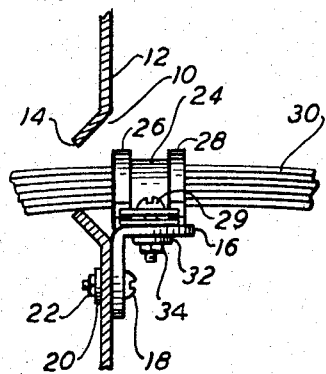
FIG. 1 is a side view of a prior art form of bulkhead cable clamp.
Figure 2:
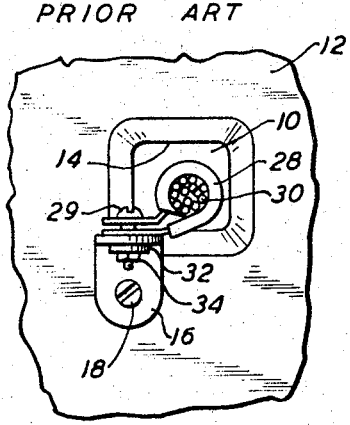
FIG. 2 is a front view of the prior art cable clamp device as shown in FIG. 1.

Turning now to FIG. 1 there is shown a side view of the bulkhead cable clamp that is commonly found in the prior art. An aperture 10 placed in a bulkhead 12 results in a continuous edge 14. This edge, due to the manner in which the aperture is made, by punches, drills or the like is generally of a rough or sharp nature, such that continuous contact between such edge 14 and the insulation of wire passed therethrough would be damaging or completely destructive to such insulation. An L bracket 16, mounted by means of a fastener 18 passed through an additional aperture within the bulkhead 12, is held in place by means of a washer 20 and a nut 22. To the L bracket 16 is attached a cable clamp 24 which has insulation therein. Such insulation extends around the edges of the clamp 24 as shown at 26 and 28. The clamp 24 is held to the L bracket 16 by means of a fastener 29, a washer 32 and a nut 34. A bundle of wires 30 are caused to pass through the clamp 24 and thence into the aperture 10 of the bulkhead 12. As can be seen from the figure the only position of support of the bundle of wires 30 is at the point where the cable clamp 24 connects about the bundle 30. The bundle of wires 30 is free at its remote end to contact the rough edges 14 of the aperture 10 caused by sag due to the weight of the bundle of wires 30 or to tension applied to the wires, such as by having an object placed upon them or someone inadvertantly stepping upon them. As can better be seen from the front view, as shown in FIG. 2, the L clamp 16 must be located in such a position that the bundle of wires 30 passing through the clamp 24 will pass through the aperture 10 at the desired position. It is essential that the clamp 24 provide a firm contact with the wires. A variety of sizes of clamp 24 are employed, depending upon the number or size of the wires in the bundle 30. As the size of the clamp 24 increases, it becomes more difficult to premount L bracket 16 with respect to the aperture 10 in the bulkhead 12 until the size of the clamp 24 is known. Further, since the clamp 24 must be placed about the wire bundle 30 it is not possible to assemble the clamp 24 until such time as the wires have been installed. Thus, on-site installation of these prior art devices are necessary. Further, these devices are insufficient to prevent rubbing and possible destruction of the insulation of the wires within the bundle 30 as they contact the rough edges 14 of the aperture 10.

Figure 3:
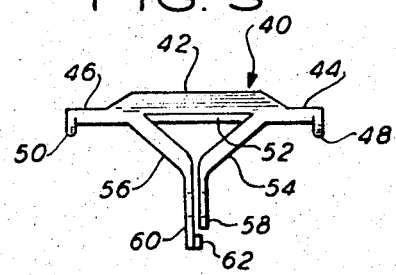
FIG. 3 is a side elevation of a bulkhead mounting plate constructed in accordance with the basic concepts of the invention.
Figure 4:
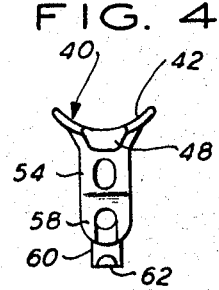
FIG. 4 is a front elevation of the bulkhead mounting plate illustrated in FIG. 3.

Turning now to FIGS. 3 and 4, a bulkhead mounting plate 40 constructed in accordance with the concepts of the invention is shown. Bulkhead mounting plate 40 consists of a single unitary member composed of the following major parts; a wire cradle 42, which as is shown in FIG. 4, is arcuate in nature, thus conforming to the general outline of a bundle of wires to be placed thereupon; a set of extensions 44 and 46 extending out from the wire cradle 42 in directions along the line of the wire bundle to be placed in the wire cradle 42. Each of the extensions 44 and 46, as will be described later with reference to FIG. 5 terminate in a stop hub 48 and 50, respectively, which serve to prevent any motion of the cable bundling straps to be placed about the extensions and the wire bundle from moving off of the mounting plate in response to tension applied to the cable bundle itself. The wire cradle 42 of the bulkhead mounting plate 40 is reinforced at 52 with additional material, to not only increase its strength but also to provide a strong contact position between the wire cradle 42 and the rough edges of any aperture in the bulk-head through which this device is passed. These points will prevent contact between the bulkhead aperture edges and the wires and thus prevent destruction, or degradation of the insulation.

Sloping from the extremes of the wire cradle 42 of the mounting plate 40 towards a position parallel with the bulkhead to which this device is to be affixed are first and second cradle support arms 54 and 56, these arms then terminate in end portions 58 and 60, which run parallel with the bulkhead to which this device is to be affixed. It can be seen that the end portion 58 of the support arm 54 is shorter than end portion 60 of support arm 56. The reason for the difference in length will be readily apparent. At the end of the end portion 60 is placed non-rotational hub 62 which will engage an aperture within the bulkhead to prevent the entire bulkhead mounting plate 40 from rotating with respect to the aperture.

Figure 5:
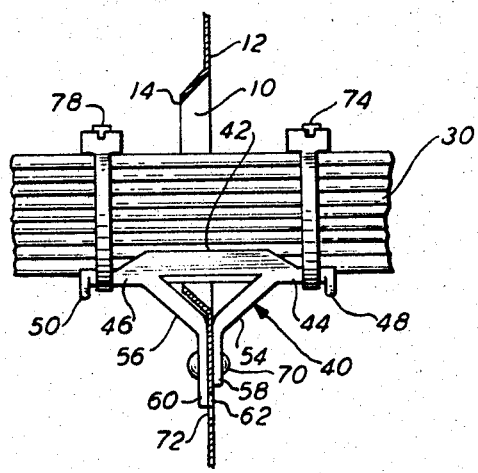
FIG. 5 illustrates the bulkhead mounting clamp located in the aperture of a bulkhead with a bundle of wires securely fastened thereto for passage through the aperture of said bulkhead.
Figure 6:
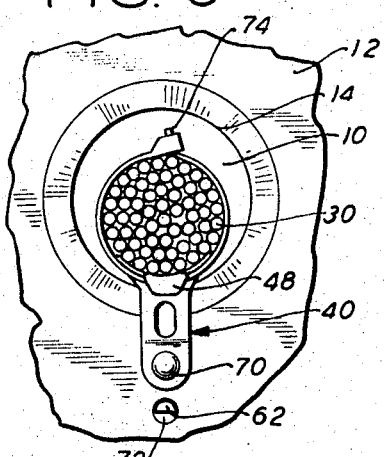
FIG. 6 is a front elevation of the bulkhead mounting plate as shown in FIG. 5.

Turning now to FIG. 5, the bulkhead mounting plate 40, together with a bundle of wires, cable straps, the bulkhead and its aperture are shown. Bulkhead 12 again has an aperture 10, with the corresponding edges 14 extending therabouts placed therein. Bulkhead mounting plate 40 has been inserted in the aperture 10 and a hole has been drilled to permit the passage of a fastener 70 therethrough to couple cradle support arms 54 and 56 to the bulkhead 12. A further aperture 72 has been drilled in the bulkhead 12 to permit entry of the non-rotational hub 62 therein as shown in FIG. 6. A cable bundle 30 is placed upon the wire cradle 42 and extends over the extension 44 and 46. Cable bundling straps 74 and 78 well known in the prior art have been attached by means, well-known in the prior art, about the extensions 44 and 46 to securely hold wire bundle 30 to the bulkhead supporting plate 40. Stop hubs 48 and 50 will prevent the cable bundling straps 74 and 78 from being moved from their positions on the extensions 44 and 46 by tension applied to the wire bundle 30.

The bulkhead mounting plate is securely held in position by the fastener 70 and is prevented from rotation by means of the entry of the non-rotational hub 62 into the aperture 72. Thus the cable bundle 30 is positioned with respect to the aperture 10 and is protected from the edges 14 of the aperture 10 by the bulkhead mounting plate itself.

Although cable bundling straps 74 and 78 have shown for the purpose of illustrating the operation device, of the bulkhead mounting plate 40, any other scheme such as cord, metal clamps or similar devices may be used to secure wire bundles to the bulkhead mounting plate. Variations in the shape of the wire cradle 42, support arms 54 and 56, end portions 58 and 60 may be made to accommodate bulkheads of greater thickness. Changes to the general form or manner of support, may be made in order to increase the strength of the device or to increase its lightness. The present form of the device represents the best compromise, presently known, between maximum support and maximum lightness so essential to these devices.

While there have been shown and described the fundamental novel features of the invention as applied to the preferred embodiment it will be understood that various omissions and substitutions and changes of the form and detail of the device illustrated and in its operation may be made by those skilled in the art, without departing from the spirit of the invention.

The embodiments of the invention in which an exclusive property or privilege is claimed are defined as follows:

1. A bulkhead mounting plate for supporting and positioning one or more wires with respect to an aperture in a member to prevent contact between such wire and the edges of said aperture comprising: cradle means adapted to support and position at least one wire; said cradle means being arcuate in the direction transverse to the length of said wire; first and second extension means coupled to said cradle means and extending out from said cradle means along the length of said wire; said first and second extension means each having restraining hubs remote from said cradle means to prevent clamping means affixed about said first and second extension means and said wire from moving off said first and second extension means; first and second cradle support means affixed to the underside of said cradle means and spaced apart from each other a distance sufficient to accommodate said member therebetween; said first and second cradle support means each having aligned apertures therein to receive a fastening device therein; a hub on said first cradle support means remote from said cradle means; said hub arranged to engage a further aperture in said member; and said second cradle support means is shorter in length along said member than said first cradle support means whereby contact between the hub on said first cradle support means and said second cradle support means through said further aperture is prevented permitting full contact between said second cradle support means and said member.

2. A bulkhead mounting plate defined in claim 1, wherein said first and second cradle support mean each have first portions parallel with said member and second portions sloping between said parallel first portions and the extremes of said cradle means.

3. A bulkhead mounting plate as defined in claim 2, wherein said cradle support means are reinforced.

4. A bulkhead mounting plate as defined in claim 3, wherein said cradle means is reinforced whereby said cradle means is strengthened and the spacing between said wire and the edge of said aperture in said member is increased.

5. A bulkhead mounting plate as defined in claim 4, wherein said entire bulkhead mounting plate is of unitary construction.

6. A bulkhead mounting plate as defined in claim 5, wherein said plate is fabricated of material which will not degrade insulation on said wire.

References Cited

UNITED STATES PATENTS

| | | | |
|---|---|---|---|
| 2,404,110 | 7/1946 | Trafton | 248—74 |
| 2,790,616 | 4/1957 | Cardinal | 248—225 X |
| 3,210,030 | 10/1965 | Ramsey | 248—71 |

CHANCELLOR E. HARRIS, *Primary Examiner.*

U.S. Cl. X.R.

248—74, 68